(12) United States Patent
Chen (10) Patent No.: US 10,775,577 B2
(45) Date of Patent: Sep. 15, 2020

(54) CABLE ASSEMBLY HAVING A CONNECTOR CAPABLE OF EMITTING OPTICAL SIGNALS AND A VISIBLE LIGHT

(71) Applicant: Cheng Sean Chen, Milpitas, CA (US)

(72) Inventor: Cheng Sean Chen, Milpitas, CA (US)

(73) Assignees: Cheng Sean Chen, Hsinchu (TW); BKS TEC CORP., Hsinchu (TW)

( * ) Notice: Subject to any disclaimer, the term of this patent is extended or adjusted under 35 U.S.C. 154(b) by 0 days.

(21) Appl. No.: 15/493,145

(22) Filed: Apr. 21, 2017

(65) Prior Publication Data

US 2018/0203195 A1 Jul. 19, 2018

Related U.S. Application Data

(60) Provisional application No. 62/446,850, filed on Jan. 17, 2017.

(51) Int. Cl.
| | |
|---|---|
| *G02B 6/42* | (2006.01) |
| *G02B 6/44* | (2006.01) |
| *G02B 6/38* | (2006.01) |
| *H04R 1/10* | (2006.01) |

(52) U.S. Cl.
CPC ......... *G02B 6/4284* (2013.01); *G02B 6/3895* (2013.01); *G02B 6/428* (2013.01); *G02B 6/4279* (2013.01); *G02B 6/4416* (2013.01); *H04R 1/1033* (2013.01)

(58) Field of Classification Search
CPC .................................................. G02B 6/4284
See application file for complete search history.

(56) References Cited

U.S. PATENT DOCUMENTS

| | | | | |
|---|---|---|---|---|
| 2007/0031777 A1* | 2/2007 | Wang | ............... | A61C 19/004 433/29 |
| 2007/0141915 A1* | 6/2007 | Kim | ............... | H01R 13/6608 439/640 |
| 2010/0028014 A1* | 2/2010 | Hosking | ............... | H04B 10/40 398/135 |
| 2015/0346448 A1* | 12/2015 | Wu | ............... | G02B 6/3817 385/102 |

FOREIGN PATENT DOCUMENTS

JP 59111606 A * 6/1984 ........... G02B 6/4415

* cited by examiner

*Primary Examiner* — Omar R Rojas
(74) *Attorney, Agent, or Firm* — Min-Lee Teng; Litron Patent & Trademark Office (57) ABSTRACT

A cable assembly includes a cable and a connector, wherein the connector of the cable assembly includes laser diodes for transmitting optical signals to optical fiber wires of the cable for transferring data received from an external device and a light-emitting diode (LED) for emitting a visible light to a plastic fiber wire of the cable so that a user can use the visible light for different purposes. In addition, the connector of the cable assembly is capable of conforming to a standard HDMI connector or integrated with an earphone.

20 Claims, 12 Drawing Sheets

CABLE ASSEMBLY HAVING A CONNECTOR CAPABLE OF EMITTING OPTICAL SIGNALS AND A VISIBLE LIGHT

CROSS-REFERENCES TO RELATED APPLICATIONS

This application claims the benefit of U.S. Provisional Patent Application No. 62/446,859 filed on Jan. 17, 2017, which is hereby incorporated by reference herein and made a part of specification.

BACKGROUND OF THE INVENTION

I. Field of the Invention

The present invention relates to a cable, and in particular, to a cable assembly having a connector that contains a circuit for converting electrical signals to optical signals.

II. Description of the Prior Art

In recent years, optical fiber has been widely used for transmitting video signals or other high data rate signals. However, it is difficult to trace a fiber cable when many fiber cables are used to connect remote devices to local devices in the same room.

Furthermore, conventional HDMI cable uses copper wire to transfer data, which has limited bandwidth and is susceptible to noise or interference.

Accordingly, the present invention proposes a better way to design a cable to overcome the above-mentioned problems.

SUMMARY OF THE INVENTION

One objective of the present invention is to provide a cable assembly having a connector that contains a circuit for converting electrical signals to optical signals for transmitting video or high data rate data, as well as for generating a visible light when certain conditions are met so that a user can use the visible light for different purposes, such as tracing and identifying a particular video fiber cable.

One objective of the present invention is to provide a cable assembly having a connector that contains a circuit for converting electrical signals to optical signals for transmitting audio data as well as generating a visible light when the audio data is transmitting in a cable of the cable assembly.

One embodiment of the present invention is to provide a cable assembly, wherein the cable assembly comprises a cable and a connector, wherein the connector of the cable assembly includes laser diodes for transmitting optical signals to optical fiber wires inside the cable and a light-emitting diode (LED) for emitting a visible light for transmitting to plastic fiber wires inside the cable, so that a user can use the visible light for identifying the cable. In addition, the connector of the cable assembly is capable of conforming to a standard HDMI connector.

One embodiment of the present invention is to provide a cable assembly, wherein the cable assembly comprises a cable comprising at least one first fiber wire and at least one second fiber wire; and a first connector connected to the cable, wherein the first connector comprises: a first interface, for connecting with an external device; and at least one circuit board, wherein a plurality of devices are disposed on the at least one circuit board to form a circuitry, wherein the circuitry comprises at least one laser diode for emitting at least one optical signal to the at least one first fiber wire and at least one first light-emitting diode (LED) for emitting a first visible light to the at least one second fiber wire.

In one embodiment, the cable comprises at least one metal wires and conforms to a standard HDMI connector.

In one embodiment, the at least one circuit board is a printed circuit board (PCB).

In one embodiment, the circuitry comprises a control IC for controlling the at least one laser diode and the at least one first LED.

In one embodiment, each LED is an RGB LED.

In one embodiment, the circuitry comprises a first switch, wherein each RGB LED emits a visible light when the first switch is on.

In one embodiment, each LED emits a visible light when the at least one laser diode is emitting the at least one optical signal.

In one embodiment, the circuitry comprises a first switch, wherein each RGB LED emits a visible light when the first switch is on.

In one embodiment, the cable assembly comprising a second connector is connected to the cable, wherein the second connector comprises: at least one second light-emitting diode (LED) for emitting a second visible light to the at least one second fiber wire.

In one embodiment, the second connector comprises a second switch, wherein each of the at least one second LED emits a visible light when the second switch is turned on.

In one embodiment, each of the at least one second LED is an RGB LED.

In one embodiment, each RGB LED emits a visible light when the second switch is on.

In one embodiment, the cable assembly further comprises a second connector, wherein the second connector and the first connector are connected by the cable, wherein the second connector is connected to an earphone.

In one embodiment, the cable assembly further comprises a second connector, wherein the second connector and the first connector are connected by the cable, wherein the second connector is integrated with an earphone.

One embodiment of the present invention is to provide an earphone integrated with a cable assembly, wherein the cable assembly comprises a cable and a connector connected to the cable, wherein the connector comprises: an interface, for connecting with an external device; and at least one circuit board, wherein a plurality of devices are disposed on the at least one circuit board to from a circuitry, wherein the circuitry comprises at least one laser diode for emitting at least one optical signal to the at least one first fiber wire and at least one light-emitting diode (LED) for emitting a first visible light to the at least one second fiber wire when the at least one laser diode is emitting the at least one optical signal.

In one embodiment, the external device is a mobile phone.

The detailed technology and above preferred embodiments implemented for the present invention are described in the following paragraphs accompanying the appended drawings for people skilled in the art to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE INVENTION

The detailed explanation of the present invention is described as follows. The described preferred embodiments are presented for purposes of illustrations and descriptions, and they are not intended to limit the scope of the present invention.

First Embodiment

This embodiment discloses a cable assembly, which can be used for transmitting video or other suitable signals; in addition, the cable assembly can emit a visible light when certain conditions are met so that a user can use the visible light for different purposes.

In this embodiment, the cable assembly conforms to the HDMI standard so that the cable assembly can be applied to any HDMI compliant device. Instead of using copper material for making the HDMI cables, active fiber optical cable is used to make the HDMI cable. In order for the user to easily identify the optical cable, the entire HDMI cable is able to light up when there is signal transmitting through the HDMI cable. Users can also choose to turn the light off completely or have it constantly lighted regardless of whether or not the signal is being transmitted. The color of the light can be changed by user; by switching colors for different cables, users can easily differentiate between different cables and their connected devices.

By using light as a transmission medium, signals can go faster and further, which provides much more bandwidth without interference. An HDMI cable made of optical fiber will also carry more video bandwidth with better quality compared to one made of copper cable.

Figure 1:
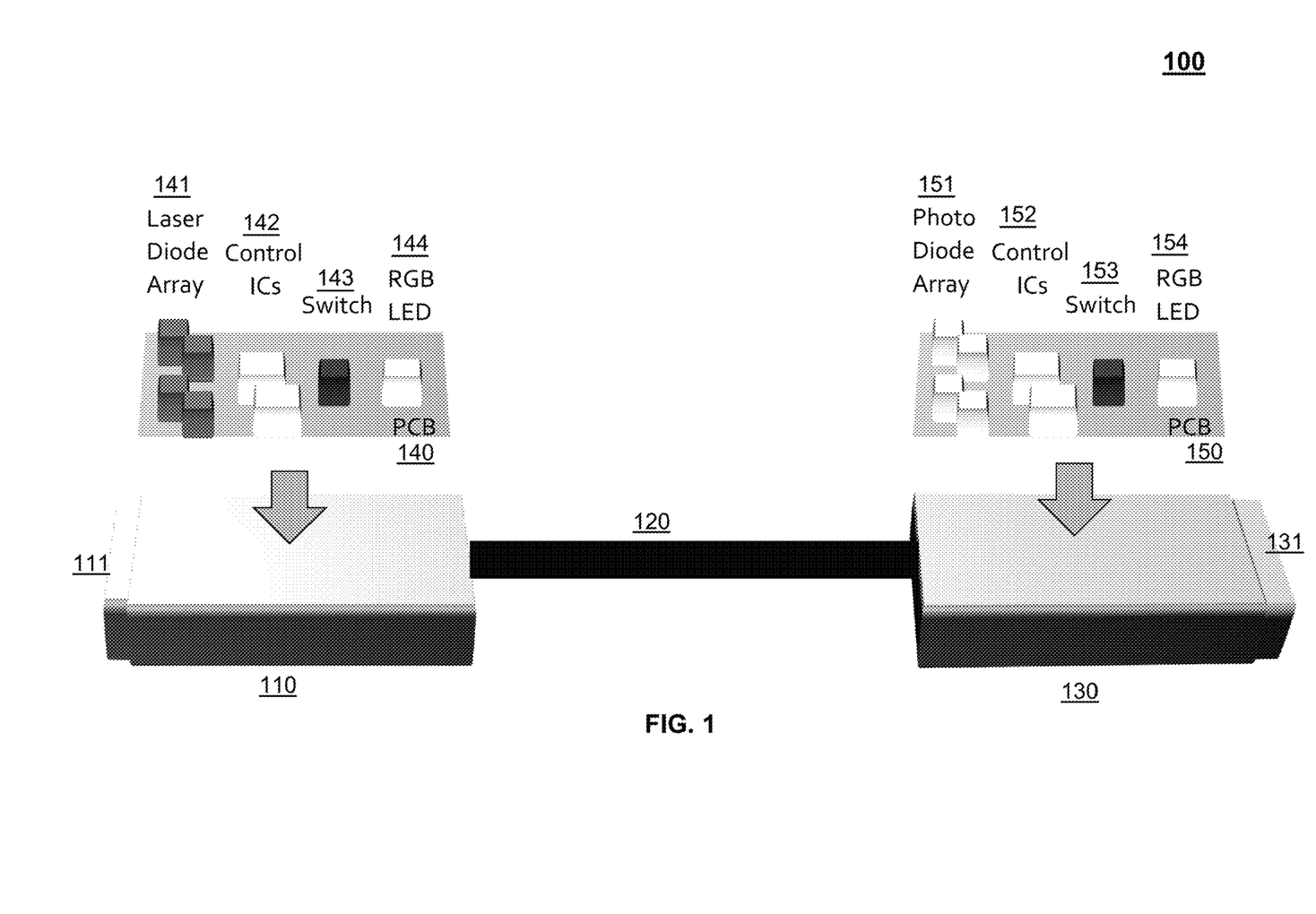
FIG. 1 illustrates a perspective view of a cable assembly according to one embodiment of present invention.

Please refer to FIG. 1, which illustrates a perspective view of a cable assembly according to one embodiment of present invention. As shown in FIG. 1, the cable assembly 100 includes a first connector 110, a second connector 130, and a cable 120 connecting the first connector 110 and the second connector 130. The first connector 110 comprises an interface 111 and a circuit board such as a printed circuit board (PCB) 140. The interface 111 is used for connecting with an external device, such as a set top box, that can send video signals to the first connector 110 via the interface 111. The printed circuit board (PCB) 140, is used to carry laser diodes 141, control IC(s) 142, a switch 143 and an RGB LED 144 so as to form a circuitry for converting electrical signals received from the interface 111 to optical signals for transmitting to the optical fiber wires inside the cable 120 as well as for generating a visible light by using the switch 143 and the RGB LED 144 when certain conditions are met.

The circuitry on the PCB 140 comprises an electrical-to-optical converting circuit, which can be implemented by using the control IC(s) 142 and the laser diodes 141, for converting a first set of electrical signals from said first interface to a first set of optical signals for transmitting to the at least one first fiber wire. The circuitry on the PCB 140 also comprises a first visible-light emitting circuit, which can be implemented by using the control IC(s) 142, the switch 143 and the RGB LED 144, for emitting a first visible light for transmitting to the at least one second fiber wire. Each of the at least one first fiber wire can be an optical fiber wire, and each of the at least one second fiber wire can be a plastic fiber wire. Please note that control IC(s) 142 can be used to control the laser diodes 141 as well as the RGB LED 144. The present invention is not limited to the implementation of the electrical-to-optical converting circuit or the visible-light emitting circuit. In addition, the present invention is not limited to how many circuit boards, or PCB(s), are used for implementing the circuitry of the first connector of the cable assembly.

In one embodiment, the RGB LED 144 emits visible light when the switch 143 is on, wherein the RGB LED 144 can emit visible light in different colors. In addition, user can use the switch 143 or with more switches to choose different light modes, which contain different colors, brightness, and lighting patterns. The RGB LED 144 can be controlled such that the RGB LED light is constantly on (with or without signal transmission), or simply turned off. The cable 120 can be constructed as a duo channel cable, which transmits both laser signals and LED light signals from one end to another. In one embodiment, the first connector 110 conforms to an HDMI standard connector.

FIG. 2A-2D show many different configurations or shapes of the cable. A cable includes at least one optical fiber wire and at least one plastic fiber wire and at least one metal wire, such as copper wire. The at least one optical fiber wire is used for transmitting optical signals, the at least one plastic fiber is used for transmitting visible lights, and the at least one metal wire, such as copper wire, is used for transfer electrical signals, such as electrical control signals. The present invention is not limited to the number of the fiber wires for transmitting data from the external device or the number of the fiber wires for transmitting the visible lights, or the number of the metal wires for transmitting electrical signals.

Figure 2A:
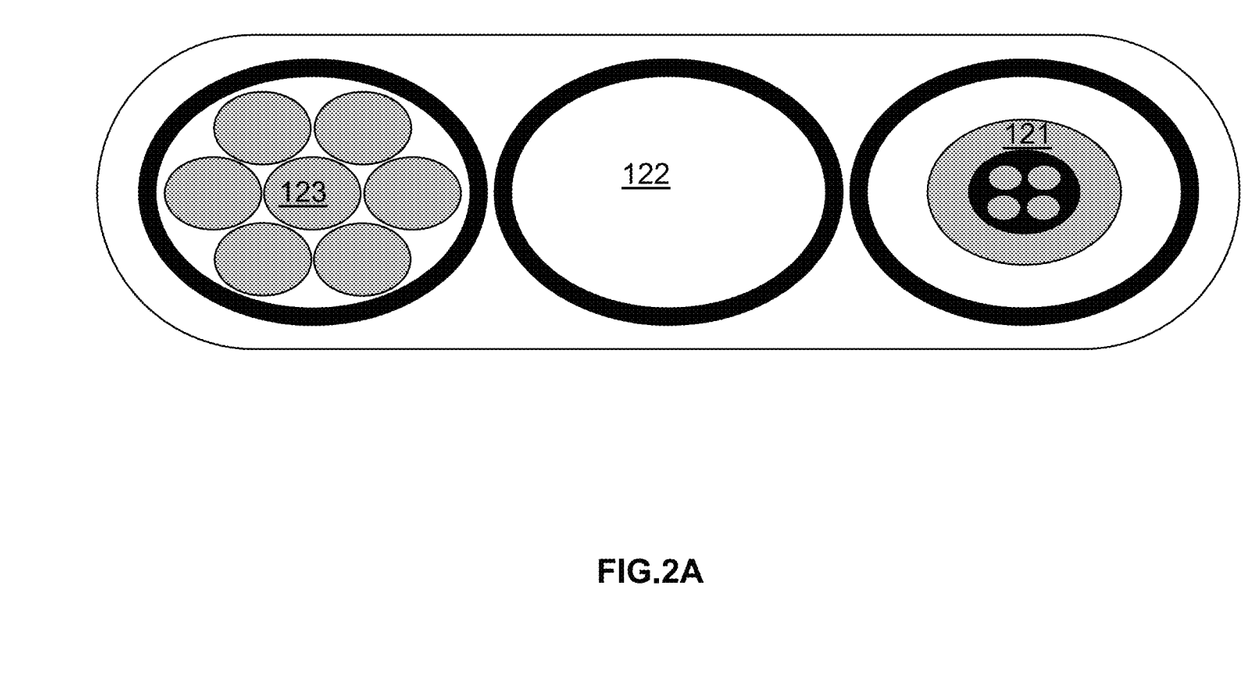
FIG. 2A-2D illustrate many different configurations or shapes of the cable according to one embodiment of present invention.

As shown in FIG. 2A, the cable 120 includes four optical fiber wires 121 and one plastic fiber wire 122, and seven metal wires 123, wherein each of the four optical fiber wires 121 is used for transmitting an optical signal, the plastic fiber 122 is used for transmitting a visible light, and each of the seven metal wires 123 is used for transmitting an electrical signal.

Figure 2B:
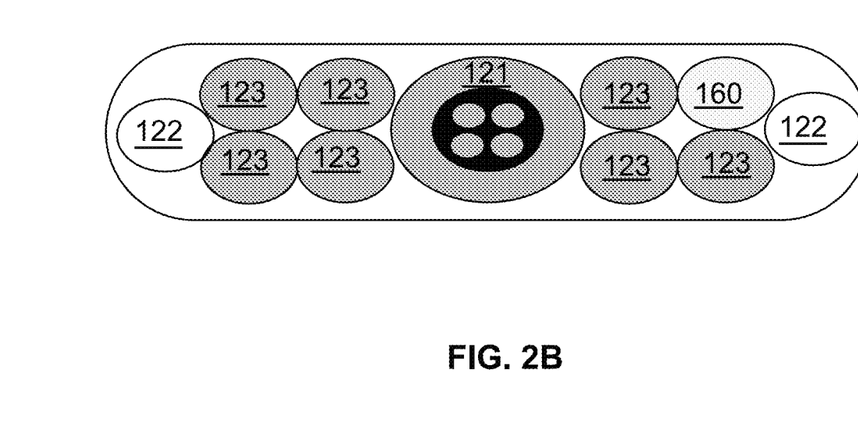

FIG. 2B shows a different configuration, wherein the cable 120 includes four optical fiber wires 121 and two plastic fiber wires 122, and seven metal wires 123, wherein each of the four optical fiber wires 121 is used for transmitting an optical signal, each of the plastic fiber wires 122 is used for transmitting a visible light, and each of the seven metal wires 123 is used for transmitting an electrical signal. Please note that there is a dummy wire 160 that is not used in this configuration.

Figure 2C:
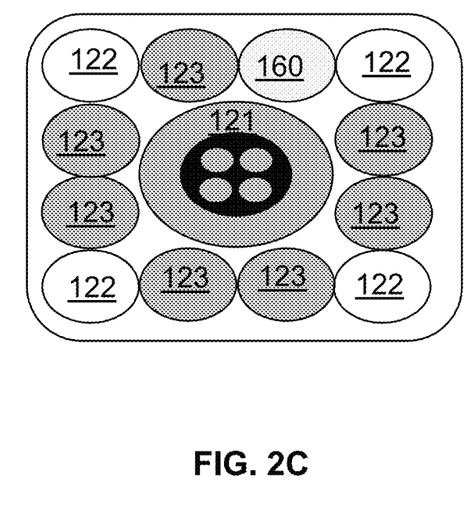

FIG. 2C shows a different configuration, wherein the cable 120 includes four optical fiber wires 121 and four plastic fiber wires 122, and seven metal wires 123, wherein each of the four optical fiber wires 121 is used for transmitting an optical signal, each of the four plastic fiber wires 122 is used for transmitting a visible light, and each of the seven metal wires 123 is used for transmitting an electrical signal. Please note that there is a dummy wire 160 that is not used in this configuration.

Figure 2D:
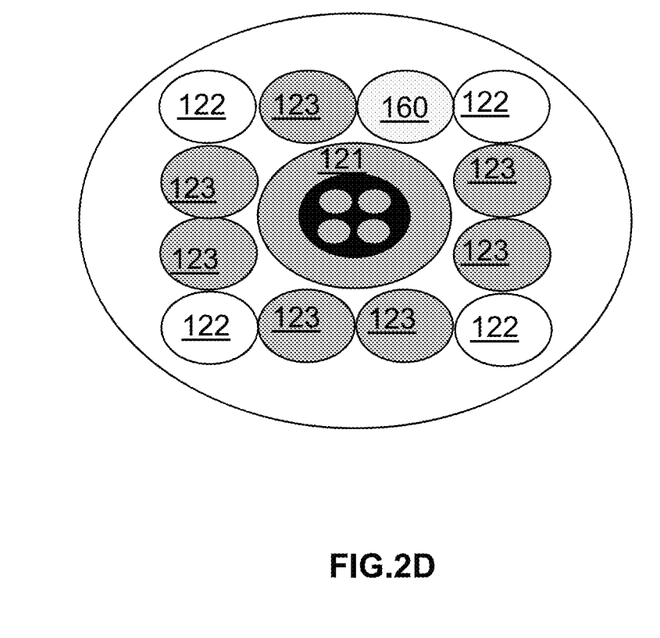

FIG. 2D shows a different configuration, wherein the cable 120 includes four optical fiber wires 121 and four plastic fiber wires 122, and seven metal wires 123, wherein each of the four optical fiber wires 121 is used for transmitting an optical signal, each of the four plastic fiber wires 122 is used for transmitting a visible light, and each of the seven metal wires 123 is used for transmitting an electrical signal. Please note that there is a dummy wire 160 that is not used in this configuration.

As shown in FIG. 1, the second connector 130 comprises: a second interface 131 for connecting with a second external device, such as a TV; an optical-to-electrical converting circuit comprising a photo diode array 151 and control IC(s) 152 for converting the optical signals back to the electrical signals for transferring data to the second external device, such as a TV; and an LED, such as an RGB LED 154, for emitting a first visible light. In one embodiment, the second connector 130 comprises a second switch 153, wherein the RGB LED 154 emits visible light when the second switch 153 is on. Please note that control IC(s) 152 can be used to control the photo diode array 151 as well as the RGB LED 154. The RGB LED 154 can emit visible light in different colors.

Figure 3A:
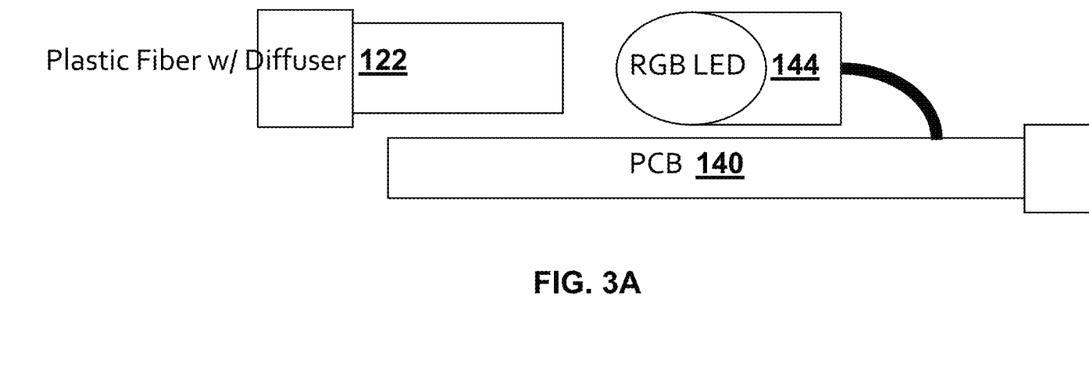
FIG. 3A-3B illustrate a setup for emitting a visible light from one or two RGB LED(s) according to one embodiment of the present invention.

FIG. 3A shows a setup for emitting a visible light from an RGB LED 144, wherein the RGB LED 144 is disposed over the PCB and the visible light emitted by the RGB LED 144 is transmitted to a plastic fiber 122. In one embodiment, the plastic fiber 122 can be integrated with a diffuser.

Figure 3B:
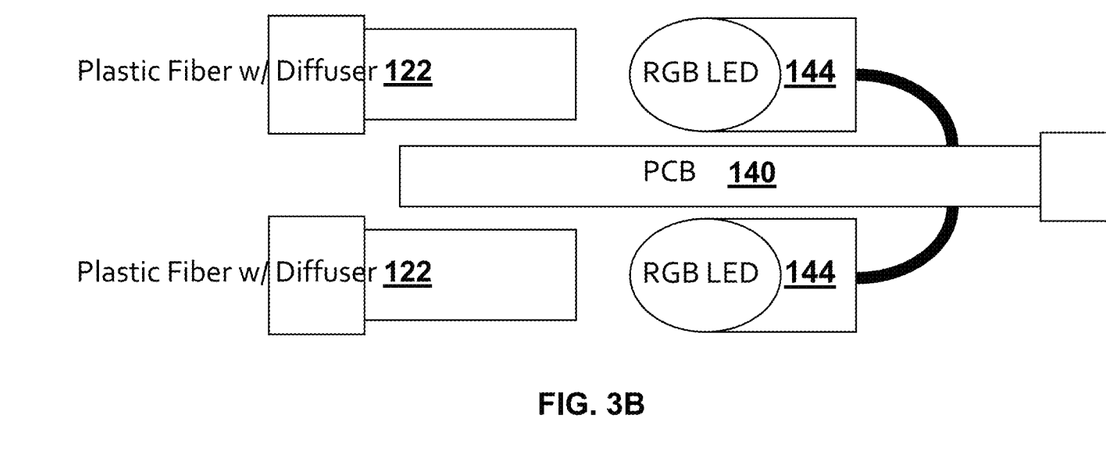

FIG. 3B shows a setup for emitting a visible light from each of two RGB LED 144, wherein one RGB LED 144 is disposed over the PCB 140 and the other RGB LED 144 is disposed under the PCB 140, and a visible light emitted by each RGB LED 144 is transmitted to a corresponding plastic fiber 122. In one embodiment, each plastic fiber 122 can be integrated with a corresponding diffuser.

Second Embodiment

This embodiment discloses a cable assembly, which can be used for transmitting audio or other suitable signals; for example, the cable assembly can be used to connect with an earphone or be integrated with an earphone.

Instead of using copper material for making the earphone cable, active fiber optical cable is used for making the earphone cable. In order for a user to easily identify cable that is made by optical fiber, the entire earphone cable is capable of lighting up when there is a signal transmitting through the cable. User can also choose to turn the light off completely or have it constantly lighted regardless of whether or not the signal is being transmitted. The color of the light can be changed by user; by switching colors for different cables, user can easily differentiate between different cables and their connected devices.

By using light as a transmission medium, signals can go faster and further, which can provide much more bandwidth without interference. An earphone cable made of optical fiber will carry more audio bandwidth with better quality compared to one made of copper cable. In addition to optical conversion, the receiving end of the earphone contains an digital audio processing IC for processing digital audio processing as well as a digital to analog (D/A) converter, which converts digital audio into auditable analog audio. The digital audio processing IC provides functions such as noise reduction, surround sound, and special audio effects.

Figure 4:
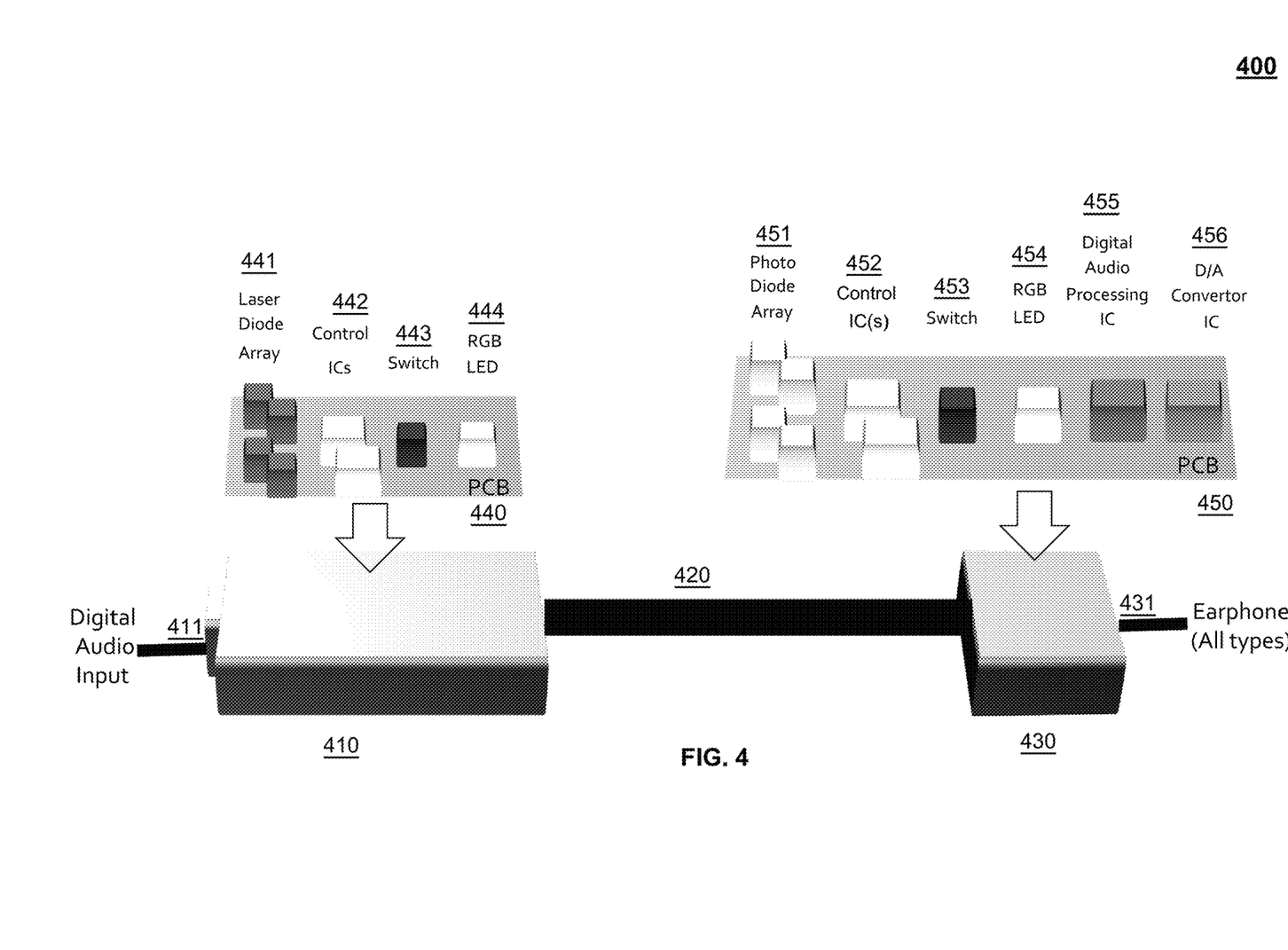
FIG. 4 illustrates a perspective view of another cable assembly according to one embodiment of present invention.

Please refer to FIG. 4, which illustrates a perspective view of a cable assembly according to one embodiment of present invention. As shown in FIG. 4, the cable assembly 400 includes a first connector 410, a second connector 430, and a cable 420 connecting the first connector 410 and the second connector 430. The first connector 410 comprises an interface 411 for connecting with an external device that can send audio signals to the first connector 410, and a circuit board such as a printed circuit board (PCB) 440, wherein laser diodes 441, control IC(s) 442, a switch 443 and an RGB LED 444 are disposed on the PCB 440 so as to form a circuitry for converting electrical signals received from the interface 411 to corresponding optical signals as well as generating a visible light by using the switch 443 and the RGB LED 444. The circuit on the PCB 440 comprises a first electrical-to-optical converting circuit, by using the control IC(s) 442 and the laser diodes 441, for converting a first set of electrical signals from said first interface to a first set of optical signals for transmitting to the at least one first fiber; and a first visible-light emitting circuit, by using the control IC(s) 442, the switch 443 and the RGB LED 444, for emitting a first visible light for transmitting to the at least one second fiber. Please note that control IC(s) 442 can be used to control laser diodes 441 as well as the RGB LED 444, and the present invention is not limited to the implementation of the electrical-to-optical converting circuit or the visible-light emitting circuit. In addition, the present invention is not limited to how many circuit boards, or PCB(s), are used for implementing the circuitry of the first connector of the cable assembly.

In one embodiment, the RGB LED 444 emits visible light when the switch 443 is on, wherein the RGB LED 444 can emit visible light in different colors. In addition, user can use the switch 443 or with more switches to choose different light modes, which contain different color, degree of lighting, and lighting pattern. The RGB LED 444 can be controlled such that the RGB LED light is constantly on (with or without signal transmission), or simply turned off. The cable 420 can be constructed as a duo channel cable, which transmits both laser signals and LED light signals from one end to another.

FIG. 5A-5D show many different configurations or shapes of the cable. The cable 420 includes at least one optical fiber and at least one plastic fiber and at least one metal wire, wherein each of the at least one optical fiber is used for transmitting optical signals so as to transfer the data from the external device, and the at least one plastic fiber is used for transmitting visible light. The present invention is not limited to the number of the optical fiber wires for transmitting data from the external device or the number of the plastic fiber wires for transmitting the visible light, or the number of the metal wires for transmitting electrical signal.

Figure 5A:
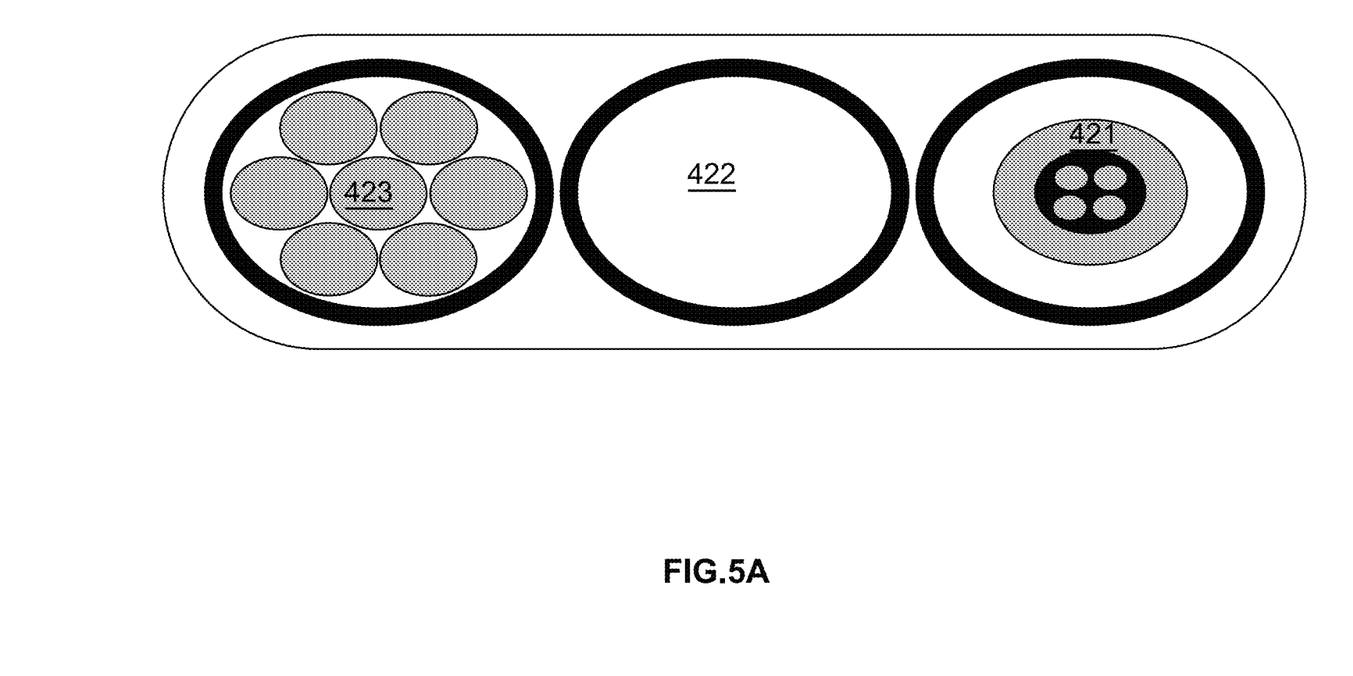
FIG. 5A-5D illustrate many different configurations or shapes of the cable according to one embodiment of present invention.

As shown in FIG. 5A, the cable 420 includes four optical fiber wires 421 and one plastic fiber wire 422, and seven metal wires 423, wherein each of the four optical fiber wire 421 is used for transmitting an optical signal, the plastic fiber 422 is used for transmitting a visible light, and each of the seven metal wires 423 is used for transmitting an electrical signal.

Figure 5B:
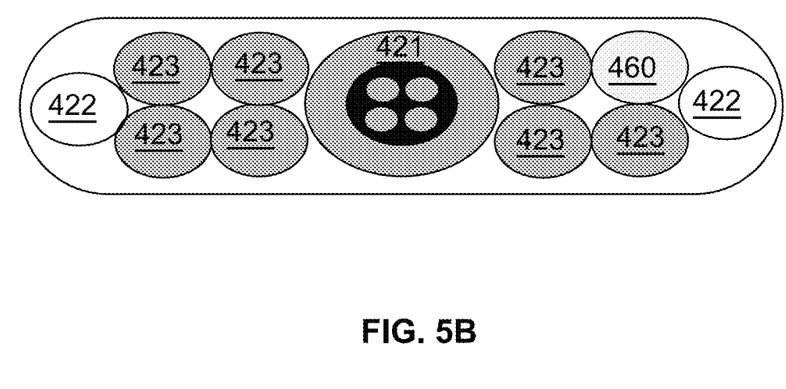

FIG. 5B shows a different configuration, wherein the cable 420 includes four optical fiber wires 421 and two plastic fiber wires 422, and seven metal wires 423, wherein each of the four optical fiber wires 421 is used for transmitting an optical signal, each of the plastic fiber wires 422 is used for transmitting a visible light, and each of the seven metal wires 423 is used for transmitting an electrical signal. Please note that there is a dummy wire 460 that is not used in this configuration.

Figure 5C:
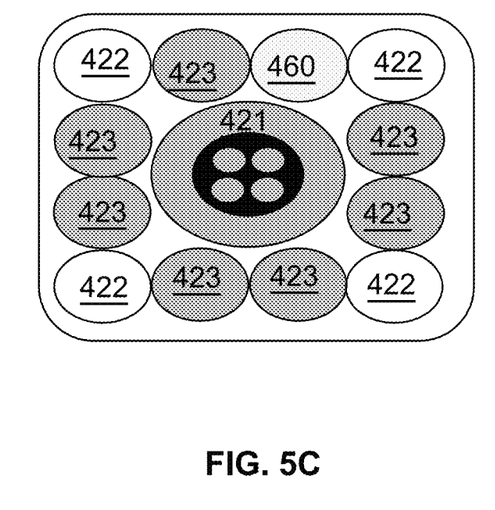

FIG. 5C shows a different configuration, wherein the cable 420 includes four optical fiber wires 421 and four plastic fiber wires 422, and seven metal wires 423, wherein each of the four optical fiber wires 421 is used for transmitting an optical signal, each of the four plastic fiber wires 422 is used for transmitting a visible light, and each of the seven metal wires 423 is used for transmitting an electrical signal. Please note that there is a dummy wire 460 that is not used in this configuration.

Figure 5D:
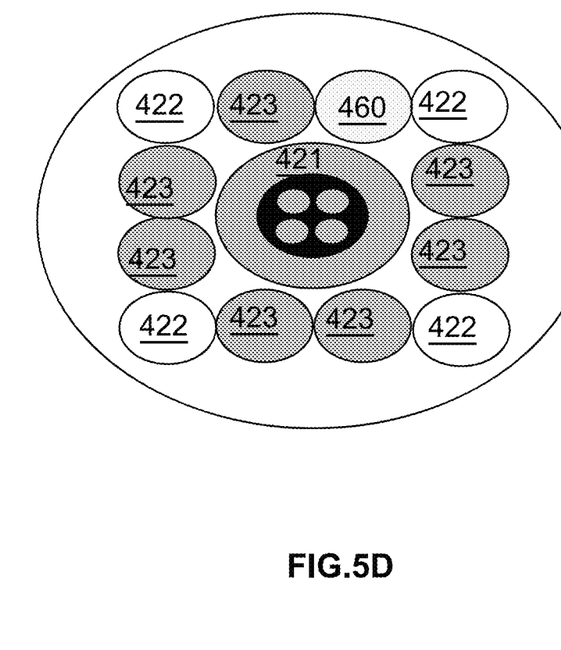

FIG. 5D shows a different configuration, wherein the cable 420 includes four optical fiber wires 421 and four plastic fiber wires 422, and seven metal wires 423, wherein each of the four optical fiber wires 421 is used for transmitting an optical signal, each of the four plastic fiber wires 422 is used for transmitting a visible light, and each of the seven metal wires 423 is used for transmitting an electrical control. Please note that there is a dummy wire 460 that is not used in this configuration.

As shown in FIG. 4, the second connector 430 comprises: a second interface 431, for connecting with a second external device so that digital audio output from the external device can be inputted to the second interface 431; an optical-to-electrical converting circuit comprising a photo diode array 451 and control IC(s) 452 for converting the first set of optical signals back to the first set of electrical signals; and a second visible-light emitting circuit comprising an LED 454, for emitting a second visible light. In one embodiment, the second connector 430 comprises a second switch 453, wherein the LED 454 emits visible light when the second switch 453 is on. Please note that control IC(s) 452 can be used to control photo diode array 451 as well as the LED 454. In one embodiment, said LED 454 is an RGB LED which can emit visible light in different colors. The second connector 430 can further comprise digital audio processing IC 455 to process the audio signals and a digital-to-analog converter (DAC) 456 for converting digital signals to analog signals for transmitting to a speaker or an earphone 480.

Figure 6A:
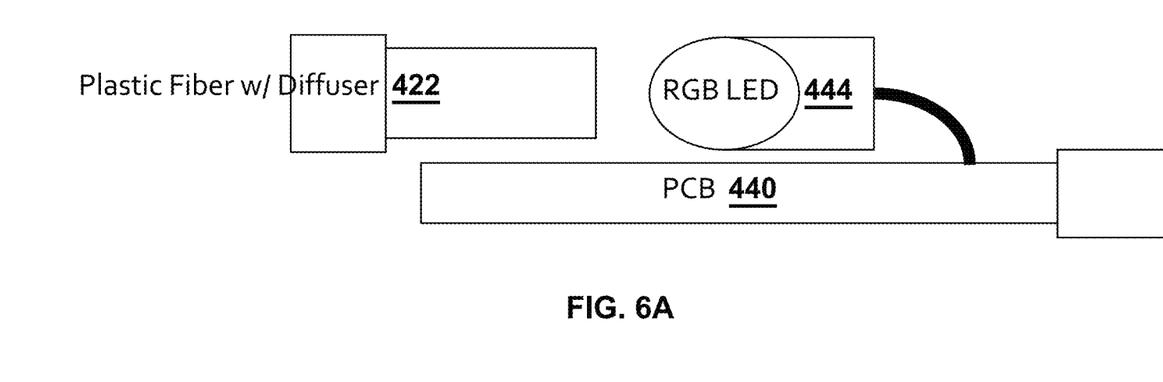
FIG. 6A-6B illustrate a setup for emitting a visible light from one or two RGB LED(s) according to one embodiment of the present invention.

FIG. 6A shows a setup for emitting a visible light from an RGB LED 544, wherein the RGB LED 144 is disposed over the PCB 440 and the visible light emitted by the RGB LED 454 is transmitted to a plastic fiber 422. In one embodiment, the plastic fiber 422 can be integrated with a diffuser.

Figure 6B:
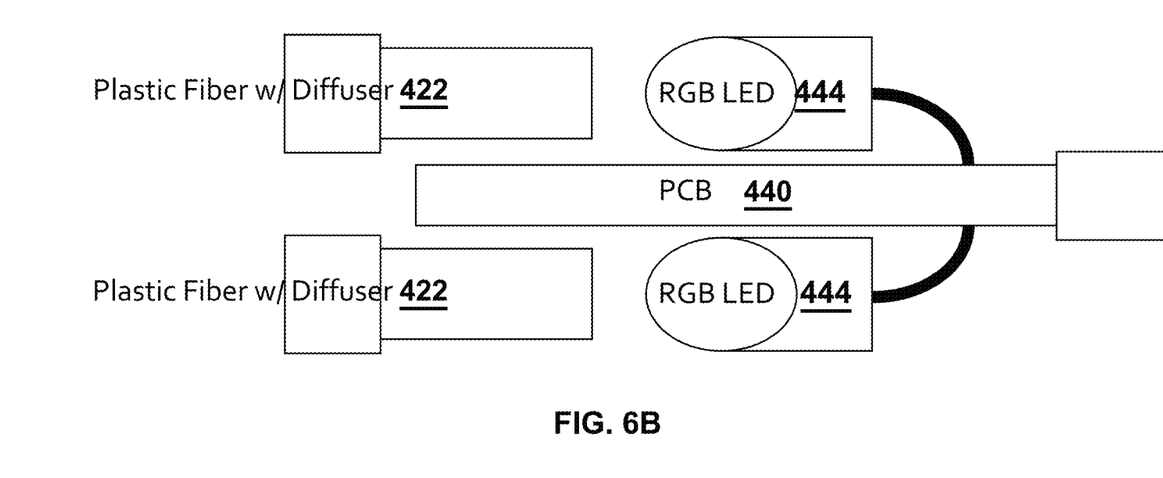

FIG. 6B shows a setup for emitting a visible light from each of two RGB LEDs 454, wherein one RGB LED 454 is disposed over the PCB 440 and the other RGB LED 454 is disposed under the PCB 440, and a visible light emitted by each RGB LED 454 is transmitted to a corresponding plastic fiber 422. In one embodiment, each plastic fiber 422 can be integrated with a corresponding diffuser.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cable assembly, comprising:
    a cable, comprising at least one first fiber wire and at least one second fiber wire; and
    a first connector connected to the cable, wherein the first connector comprises:
        a first interface, for connecting with an external device to receive data therefrom; and
        at least one circuit board, wherein a plurality of devices are disposed on the at least one circuit board to form a circuitry, wherein the circuitry comprises at least one laser diode for emitting at least one optical signal having a wavelength greater than 980 nm to the at least one first fiber wire so as to transfer the data received from the external device and at least one first light-emitting diode (LED) for emitting a first visible light to the at least one second fiber wire of the cable.

2. The cable assembly as claimed in claim 1, wherein the first visible light emitted by the first LED is visible at the remote end of the cable so that the cable is capable of being identified at the remote end.

3. The cable assembly as claimed in claim 2, wherein the first connector conforms to a standard HDMI connector.

4. The cable assembly as claimed in claim 1, wherein the at least one circuit board is a single printed circuit board (PCB).

5. The cable assembly as claimed in claim 1, wherein the circuitry comprises at least one control IC for controlling the at least one laser diode and the at least one first LED.

6. The cable assembly as claimed in claim 1, wherein the first LED is an RGB LED.

7. The cable assembly as claimed in claim 1, wherein the circuitry comprises a first switch, wherein the first LED emits the first visible light when the first switch is on.

8. The cable assembly as claimed in claim 1, wherein the first LED emits the first visible light when the at least one laser diode is emitting the at least one optical signal.

9. The cable assembly as claimed in claim 6, wherein the circuitry comprises a first switch, wherein the RGB LED emits the first visible light when the first switch is on.

10. The cable assembly as claimed in claim 1, further comprising a second connector connected to the cable, wherein the second connector comprises at least one second light-emitting diode (LED) for emitting a second visible light to the at least one second fiber wire.

11. The cable assembly as claimed in claim 10, wherein the second connector comprises a second switch, wherein the second LED emits the second visible light when the second switch is on.

12. The cable assembly as claimed in claim 10, wherein the second LED is an RGB LED.

13. The cable assembly as claimed in claim 12, wherein the RGB LED emits the second visible light when the second switch is on.

14. The cable assembly as claimed in claim 1, further comprising a second connector, wherein the second connector and the first connector are connected by the cable, wherein the second connector is connected to an earphone.

15. The cable assembly as claimed in claim 10, further comprising a second connector, wherein the first connector is connected to a set top box and the second connector is connected to a TV.

16. An earphone integrated with a cable assembly, wherein the cable assembly comprises a cable and a connector connected to the cable, wherein the connector comprises:
    an interface, for connecting with an external device to receive data therefrom; and
    at least one circuit board, wherein a plurality of devices are disposed on the at least one circuit board to form a circuitry, wherein the circuitry comprises at least one laser diode for emitting at least one optical signal having a wavelength greater than 980 nm to the at least one first fiber wire so as to transfer the data received from the external device and at least one first light-emitting diode (LED) for emitting a first visible light to the at least one second fiber wire of the cable when the at least one laser diode is emitting the at least one optical signal.

17. The earphone integrated with a cable assembly as claimed in claim 16, wherein the first visible light emitted by the first LED is visible at the remote end of the cable so that the cable is capable of being identified at the remote end.

18. The earphone integrated with a cable assembly as claimed in claim 16, wherein the LED is an RGB LED.

19. The earphone integrated with a cable assembly as claimed in claim 18, wherein the RGB LED flashes according to a pre-determined interval.

20. The earphone integrated with a cable assembly as claimed in claim 16, wherein the at least one circuit board is a single PCB.

* * * * *